(12) United States Patent
An et al.

(10) Patent No.: US 12,325,015 B2
(45) Date of Patent: Jun. 10, 2025

(54) CERIUM DIOXIDE-SUPPORTED LOW-DOSE PtCu ULTRAFINE ALLOY CATALYST, PREPARATION METHOD AND APPLICATION THEREOF

(71) Applicant: GUANGDONG UNIVERSITY OF TECHNOLOGY, Guangdong (CN)

(72) Inventors: Taicheng An, Guangdong (CN); Jiejing Kong, Guangdong (CN); Guiying Li, Guangdong (CN)

(73) Assignee: GUANGDONG UNIVERSITY OF TECHNOLOGY, Guangdong (CN)

( * ) Notice: Subject to any disclaimer, the term of this patent is extended or adjusted under 35 U.S.C. 154(b) by 1035 days.

(21) Appl. No.: 17/344,989

(22) Filed: Jun. 11, 2021

(65) Prior Publication Data
US 2022/0111364 A1 Apr. 14, 2022

Related U.S. Application Data

(63) Continuation-in-part of application No. PCT/CN2020/133945, filed on Dec. 4, 2020.

(30) Foreign Application Priority Data

Oct. 23, 2019 (CN) .......................... 201911011055.1

(51) Int. Cl.
*B01J 23/89* (2006.01)
*B01D 53/00* (2006.01)
(Continued)

(52) U.S. Cl.
CPC ........ *B01J 23/8926* (2013.01); *B01D 53/007* (2013.01); *B01D 53/8668* (2013.01);
(Continued)

(58) Field of Classification Search
CPC ........ B01J 23/8926; B01J 8/067; B01J 19/14; B01J 23/10; B01J 35/39; B01J 37/0072;
(Continued)

(56) References Cited

FOREIGN PATENT DOCUMENTS

| CN | 105470531 | 4/2016 |
| CN | 108620092 | 10/2018 |

(Continued)

OTHER PUBLICATIONS

English translation of CN 111326753A (Year: 2020).*

(Continued)

*Primary Examiner* — Daniel C. McCracken
*Assistant Examiner* — Joshua Maxwell Speer
(74) *Attorney, Agent, or Firm* — JCIPRNET

(57) ABSTRACT

The present invention provides a cerium dioxide-supported low-dose PtCu ultrafine alloy catalyst, a preparation method and an application thereof, which belongs to the fields of environmental catalysis and preparation of catalyst materials. Metal-state PtCu ultrafine alloy particles are prepared by an oleylamine method, and then a cerium dioxide support is immersed into an n-butylamine solution of PtCu ultrafine alloy, centrifuged, washed with alcohol, and dried to obtain the cerium dioxide-supported low-dose PtCu ultrafine alloy catalyst. The catalyst obtained has excellent activity and stability in simultaneously degrading atmospheric VOCs and soot under a photothermocatalytic condition. There are the characteristics of simple preparation process method, very low Pt dosage, high utilization rate, and excellent photothermocatalytic performance.

8 Claims, 1 Drawing Sheet

(51) Int. Cl.
 *B01D 53/86*  (2006.01)
 *B01J 8/06*  (2006.01)
 *B01J 19/14*  (2006.01)
 *B01J 23/10*  (2006.01)
 *B01J 35/39*  (2024.01)
 *B01J 37/00*  (2006.01)
 *B01J 37/04*  (2006.01)
 *B01J 37/06*  (2006.01)
 *B01J 37/08*  (2006.01)

(52) U.S. Cl.
 CPC .............. *B01J 8/067* (2013.01); *B01J 19/14* (2013.01); *B01J 23/10* (2013.01); *B01J 35/39* (2024.01); *B01J 37/0072* (2013.01); *B01J 37/009* (2013.01); *B01J 37/04* (2013.01); *B01J 37/06* (2013.01); *B01J 37/082* (2013.01); *B01D 2255/1021* (2013.01); *B01D 2255/20761* (2013.01); *B01D 2255/802* (2013.01); *B01D 2257/7022* (2013.01); *B01D 2257/708* (2013.01)

(58) Field of Classification Search
 CPC . B01J 37/009; B01J 37/04; B01J 37/06; B01J 37/082; B01J 35/394; B01J 23/894; B01J 37/0203; B01J 37/0205; B01J 37/0207; B01J 37/031; B01J 37/08; B01J 37/343; B01D 53/007; B01D 53/8668; B01D 2255/1021; B01D 2255/20761; B01D 2255/802; B01D 2257/7022; B01D 2257/708; B01D 2255/2065; B01D 53/885; B01D 49/00; B01D 2257/702; Y02A 50/20

See application file for complete search history.

(56) References Cited

FOREIGN PATENT DOCUMENTS

| | | | | |
|---|---|---|---|---|
| CN | 108940306 | | 12/2018 | |
| CN | 109108303 | | 1/2019 | |
| CN | 110947397 | | 4/2020 | |
| CN | 111326753 A | * | 6/2020 | ............ B82Y 30/00 |
| WO | 2016135268 | | 9/2016 | |
| WO | 2017207839 | | 12/2017 | |

OTHER PUBLICATIONS

Paul N. Duchesne et al., "Golden single-atomic-site platinum electrocatalysts", nature materials, vol. 17, Aug. 13, 2018, pp. 1-9.

* cited by examiner

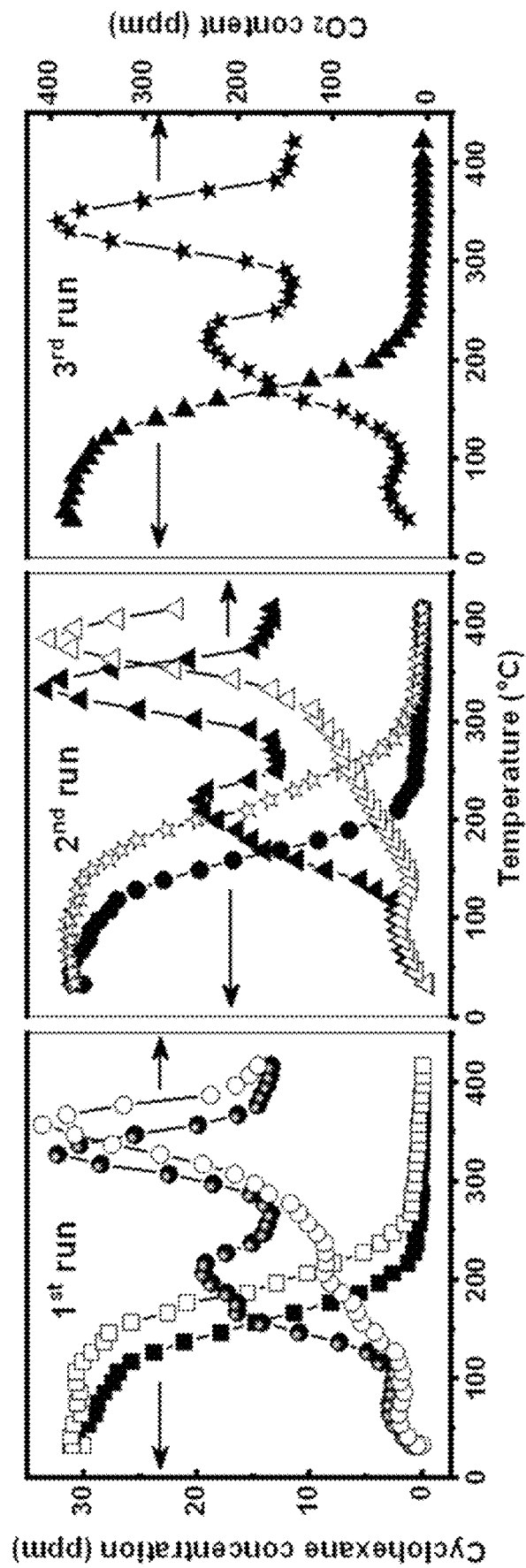

CERIUM DIOXIDE-SUPPORTED LOW-DOSE PtCu ULTRAFINE ALLOY CATALYST, PREPARATION METHOD AND APPLICATION THEREOF

CROSS-REFERENCE TO RELATED APPLICATION

This is a continuation-in-part application of International Application No. PCT/CN2020/133945, filed on Dec. 4, 2020, which claims the priority benefits of China Application No. 201911011055.1, filed on Oct. 23, 2019. The entirety of each of the above-mentioned patent applications is hereby incorporated by reference herein and made a part of this specification.

BACKGROUND

Technical Field

The present invention belongs to the fields of environmental catalysis and preparation of catalyst materials, and more particularly, relates to a cerium dioxide-supported low-dose PtCu ultrafine alloy catalyst, a preparation method and an application thereof.

With the development of urbanization, generation amount of municipal solid waste is increasing, and incineration is a main way to treat the municipal solid waste. A lot of VOCs, and smoke and dust (such as soot) may be generated during incineration, which seriously affect the quality of atmospheric environment.

In recent years, a photothermocatalytic technology has attracted much attention in atmospheric purification, and a core of the technology is the development of a catalyst with a high activity and a high stability. A supported noble metal catalyst can degrade an atmospheric pollutant under a relatively mild condition owing to its high oxidation activity and low oxidation temperature. However, hydrocarbon molecules in some pollutants cannot be completely mineralized due to excessively rapid degradation, resulting in easy coverage of deposited carbon on a catalyst surface, which seriously affects a catalytic stability thereof. In addition, the deposited carbon and the soot are similar in formation, and the soot is easy to adsorb and degrade an intermediate product due to a porous structure thereof, which is easy to cause aggregation of carbon species, and aggravates the formation of the deposited carbon. Therefore, the development of a noble metal catalyst with a high coke resistance has a certain application potential in photothermocatalytic degradation of organic pollutants and oxidation of the soot.

For the supported noble metal catalyst, there are three main factors that affect the formation of the deposited carbon. (1) Size and loading capacity of noble metal. Since a relatively large-sized metal active structure is generally required in nucleation of the deposited carbon, reduction of the size can inhibit the formation of the deposited carbon. In addition, an excessively high loading capacity of a noble metal active ingredient makes a dense active site participate in more catalytic reactions, which is easy to lead to rapid accumulation of the deposited carbon. (2) Acidity and alkalinity of support. Researches show that a strong acid site is more likely to cause carbon polymerization, and reduction of an acid strength on the surface of the catalyst can effectively inhibit the nucleation and growth of the carbon species. (3) Interaction between noble metal and support. A strong interaction force between the noble metal and the support can reduce a mobility of metal particles on a support surface, generates a highly dispersed active phase and a metal active structure with a smaller size, affects a selectivity of a reactant, and inhibits dissociation and dehydrogenation of hydrocarbon molecules, thus reducing the formation of the deposited carbon.

Researches show that introduction of a second metal phase in a supported alloy catalyst can not only effectively reduce a particle size of the noble metal, increase exposed atoms on a surface thereof, and reduce a total loading capacity of the noble metal, but also strengthen the interaction between the noble metal and the support, improve a dispersion degree of the noble metal, and prevent the noble metal from coarsening and agglomeration under a high-temperature reaction. The low loading capacity and the high dispersion degree of the noble metal can not only effectively improve a utilization rate of the noble metal, and ensure a high activity of the catalyst, but also reduce a cost, and moreover, the dispersed active site can delay the rapid accumulation of the deposited carbon, thus improving a catalytic stability. Therefore, the catalytic activity and the coke resistance of the catalyst can be effectively improved during catalytic oxidation by constructing the supported low-dose ultrafine alloy catalyst, and reducing the acid strength on the support surface at the same time, thus improving the catalytic stability thereof.

SUMMARY

In order to solve the deficiencies and shortcomings in the above prior art, the primary objective of the present invention lies in providing a preparation method of a cerium dioxide-supported low-dose PtCu ultrafine alloy catalyst, which strictly controls a particle size of PtCu.

Another objective of the present invention lies in providing a cerium dioxide-supported low-dose PtCu ultrafine alloy catalyst prepared by the above preparation method; and PtCu alloy of the catalyst is small in size and low in loading capacity, and a cerium dioxide support is rich in weak acid sites, thus being beneficial for adsorption and degradation of a reactant and activation of oxygen. Under a synergistic action of the PtCu ultrafine alloy and the cerium dioxide support, a catalytic activity and a carbon deposition resistance thereof during photothermocatalysis are improved, and problems of a large loading capacity, a low utilization rate, easy loss of active ingredients, a poor catalytic stability, and the like of a traditional noble metal catalyst are solved.

Yet another objective of the present invention lies in providing an application of the above cerium dioxide-supported low-dose PtCu ultrafine alloy catalyst.

The objectives of the present invention are achieved by the following technical solutions.

A preparation method of a cerium dioxide-supported low-dose PtCu ultrafine alloy catalyst includes the following steps:

step S1, mixing chloroplatinic acid, copper acetate, and oleylamine, and dripping ethylene glycol while stirring to obtain a solution A;

step S2, carrying out an oil bath reaction on the solution A under protection of argon, and cooling to 30° C. to obtain a solution B;

step S3, centrifuging the solution B to obtain a solid-phase substance C; and washing and purifying the solid-phase substance C to obtain a solid-phase substance D; and step S4, dissolving the solid-phase substance D in n-butylamine to obtain a solution E; immersing cerium dioxide powder in the solution E, magnetically stirring in a dark place, centrifuging to obtain a solid-phase substance F, and washing with alcohol and drying in vacuum to obtain the cerium dioxide-supported low-dose PtCu ultrafine alloy catalyst.

A molar ratio of the chloroplatinic acid to the copper acetate in the step S1 is 1:1 to 1:30; a volume ratio of the oleylamine to the ethylene glycol is 1:0.1 to 1:10; and a ratio of the chloroplatinic acid to the oleylamine is 0.3 $\mu mol \cdot mL^{-1}$ to 0.6 $\mu mol \cdot mL^{-1}$.

A specific process of the carrying out the oil bath reaction under the protection of the argon in the step S2 is: continuously introducing the argon into the solution A to remove $O_2$ in the solution A, then sealing a round-bottom flask filled with the solution A, and transferring the round-bottom flask filled with the solution A into a constant-temperature magnetic stirrer to carry out the oil bath reaction, wherein the oil bath reaction is carried out at 80° C. to 320° C. for 1 hour to 36 hours.

The centrifuging in the step S3 is carried out at a revolution of 5,000 rpm to 10,000 rpm for 10 minutes to 360 minutes.

A specific process of the washing and the purifying in the step S3 is: step I, adding absolute ethyl alcohol into the solid-phase substance C to obtain a first mixture, wherein a volume ratio of the solid-phase substance C to the absolute ethyl alcohol is 1:5 to 1:50, and centrifuging the first mixture after ultrasonic mixing; step II, adding n-hexane to obtain a second mixture, wherein a volume ratio of the solid-phase substance C to the n-hexane is 1:5 to 1:50, and centrifuging the second mixture after ultrasonic mixing; step III, repeating the step II once; and step IV, repeating the step I for three times, and then obtaining the solid-phase substance D.

A volume ratio of the solid-phase substance D to the n-butylamine in the step S4 is 1:10 to 1:50; and the centrifuging is carried out at a revolution of 3,000 rpm to 10,000 rpm for 3 minutes to 30 minutes.

The cerium dioxide powder in the step S4 is obtained through modification treatment, and the modification method specifically includes: placing the cerium oxide powder in a fixed bed reactor, controlling a humidity in the reactor by adopting a nitrogen bubbling device, wherein the humidity is 10% to 90%, and calcining at 200° C. to 600° C. for 1 hour to 12 hours in a mixed gas atmosphere of hydrogen and nitrogen, wherein a volume ratio of the hydrogen to the nitrogen in the mixed gas is 1:0.1 to 1:10; and then carrying out dehumidification, which introduces nitrogen for blowing for 1 hour at a calcination temperature in a previous stage, and finally calcining at 200° C. to 800° C. for 1 hour to 24 hours in a mixed gas atmosphere of air and nitrogen, wherein a volume ratio of the air to the nitrogen in the mixed gas is 1:0.1 to 1:10.

In the step S4, a specific process of the washing with alcohol is: adding absolute ethyl alcohol into the solid-phase substance F to obtain a third mixture, wherein a volume ratio of the solid-phase substance F to the absolute ethyl alcohol is 1:5 to 1:30, and centrifuging the third mixture after ultrasonic mixing; and the drying in vacuum is specifically carried out at 30° C. to 120° C. for 6 hours to 72 hours.

According to a cerium dioxide-supported low-dose PtCu ultrafine alloy catalyst prepared by the above preparation method, the catalyst takes cerium dioxide as a support and Cu as an assistant to load an active ingredient Pt, wherein a mass percentage of the PtCu ultrafine alloy is 0.01% to 10%, and a molar ratio of the Pt to the Cu is 1:1 to 1:30.

An application of the above cerium dioxide-supported low-dose PtCu ultrafine alloy catalyst in simultaneously degrading cyclohexane and soot under a photothermocatalytic condition is provided.

Compared with the prior art, the present invention has the following advantages and beneficial effects.

(1) According to the present invention, the size of the PtCu alloy is strictly controlled, and the interaction force between the active ingredient Pt and the cerium dioxide support is strengthened, thus improving a photothermocatalytic activity thereof.

(2) According to the present invention, the metal-state PtCu alloy is obtained by a one-step method without calcination and reduction in a reducing atmosphere, thus avoiding coarsening of alloy particles under high-temperature calcination.

(3) According to the present invention, under a synergistic action of the PtCu ultrafine alloy and the weak-acidic cerium dioxide support, the carbon deposition resistance is improved, thus improving the photothermocatalytic stability thereof.

(4) According to the present invention, a preparation process is simple, a dispersion degree of Pt is high, a dosage is low, and a utilization rate is high.

BRIEF DESCRIPTION OF THE DRAWINGS

FIG. 1 is a cycling stability test chart of a cerium dioxide-supported low-dose PtCu ultrafine alloy catalyst simultaneously degrading cyclohexane and soot under a photothermocatalytic condition, wherein a solid marking pattern shows a cerium dioxide-supported low-dose PtCu ultrafine alloy catalyst 1, and a hollow marking pattern shows a cerium dioxide-supported low-dose Pt catalyst 1.

DESCRIPTION OF THE EMBODIMENTS

The present invention is further described hereinafter by the specific embodiments, but the specific embodiments do not limit the present invention. Those skilled in the art can make various modifications or improvements according to the basic idea of the present invention, but the modifications or improvements are all included in the scope of the present invention as long as they do not deviate from the basic idea of the present invention. Unless otherwise specified, the technical means used in the embodiments are conventional means well known to those skilled in the art. Unless otherwise specified, reagents, methods, and devices adopted in the present invention are conventional reagents, methods, and devices in the technical field.

Embodiment 1

In step S1, 10.3 μmol of chloroplatinic acid, 10.3 μmol of copper acetate, and 20 mL of oleylamine were put into a round-bottom flask, and 20 mL of ethylene glycol was added dropwise while stirring to obtain a solution A.

In step S2, argon was continuously introduced into the solution A to remove $O_2$ in the solution A, then the round-bottom flask filled with the solution A was sealed, and transferred into a constant-temperature magnetic stirrer to carry out an oil bath reaction, wherein the oil bath reaction was carried out at 180° C. for 1 hour, and then the mixture was cooled to 30° C. to obtain a solution B.

In step S3, the solution B was centrifuged to obtain a solid-phase substance C, wherein the centrifugation was carried out at a revolution of 10,000 rpm for 20 minutes. The solid-phase substance C was washed and purified, wherein a specific process was that: step I, 30 mL of absolute ethyl alcohol was added into the solid-phase substance C, and the mixture was centrifuged after ultrasonic mixing; step II, 30 mL of n-hexane was added, and the mixture was centrifuged after ultrasonic mixing; step III, the step II was repeated once; and step IV, the step I was repeated for three times, and then a solid-phase substance D was obtained.

In step S4, the solid-phase substance D was dissolved in 15 mL of n-butylamine to obtain a solution E, and cerium dioxide powder was modified. A preparation method of the cerium dioxide was that: 1.1 g of cerium oxide powder was transferred into a fixed bed reactor, a humidity in the reactor was controlled by adopting a nitrogen bubbling device, wherein the humidity was 30%, and calcination was carried out at 400° C. for 2 hours in a mixed gas atmosphere of hydrogen and nitrogen, wherein a volume ratio of the hydrogen to the nitrogen in the mixed gas was 1:1. Then, dehumidification was carried out by introducing nitrogen for blowing at 400° C. for 1 hour, and then calcination was carried out at 400° C. for 2 hours in a mixed gas atmosphere of air and nitrogen, wherein a volume ratio of the air to the nitrogen in the mixed gas was 1:1. Then, 1 g of modified cerium dioxide powder was immersed in the solution E, magnetically stirred in a dark place, and then centrifuged, washed with alcohol and dried in vacuum in sequence. The centrifugation was carried out at a revolution of 8,000 rpm for 10 minutes. A specific process of the washing with alcohol was that: 20 mL of absolute ethyl alcohol was added, the mixture was centrifuged after ultrasonic mixing, and repeated for three times. The drying in vacuum was carried out at 60° C. for 12 hours. Finally, a cerium dioxide-supported low-dose PtCu ultrafine alloy catalyst 1 was obtained, wherein a mass percentage of the PtCu ultrafine alloy was 0.27%.

Embodiment 2

In step S1, 1.2 μmol of chloroplatinic acid, 12 μmol of copper acetate, and 4 mL of oleylamine were put into a round-bottom flask, and 36 mL of ethylene glycol was added dropwise while stirring to obtain a solution A.

In step S2, argon was continuously introduced into the solution A to remove $O_2$ in the solution A, then the round-bottom flask filled with the solution A was sealed, and transferred into a constant-temperature magnetic stirrer to carry out an oil bath reaction, wherein the oil bath reaction was carried out at 240° C. for 2 hours, and then the mixture was cooled to 30° C. to obtain a solution B.

In step S3, the solution B was centrifuged to obtain a solid-phase substance C, wherein the centrifugation was carried out at a revolution of 8,000 rpm for 60 minutes. The solid-phase substance C was washed and purified, wherein a specific process was that: step I, 20 mL of absolute ethyl alcohol was added into the solid-phase substance C, and the mixture was centrifuged after ultrasonic mixing; step II, 20 mL of n-hexane was added, and the mixture was centrifuged after ultrasonic mixing; step III, the step II was repeated once; and step IV, the step I was repeated for three times, and then a solid-phase substance D was obtained.

In step S4, the solid-phase substance D was dissolved in 15 mL of n-butylamine to obtain a solution E, and cerium dioxide powder was modified. A preparation method of the cerium dioxide was that: 1.1 g of cerium oxide powder was transferred into a fixed bed reactor, a humidity in the reactor was controlled by adopting a nitrogen bubbling device, wherein the humidity was 20%, and calcination was carried out at 300° C. for 8 hours in a mixed gas atmosphere of hydrogen and nitrogen, wherein a volume ratio of the hydrogen to the nitrogen in the mixed gas was 1:0.5. Then, dehumidification was carried out by introducing nitrogen for blowing at 300° C. for 1 hour, and then calcination was carried out at 300° C. for 15 hours in a mixed gas atmosphere of air and nitrogen, wherein a volume ratio of the air to the nitrogen in the mixed gas was 1:0.5. Then, 1 g of modified cerium dioxide powder was immersed in the solution E, magnetically stirred in a dark place, and then centrifuged, washed with alcohol and dried in vacuum in sequence. The centrifugation was carried out at a revolution of 5,000 rpm for 20 minutes. A specific process of the washing with alcohol was that: 20 mL of absolute ethyl alcohol was added, the mixture was centrifuged after ultrasonic mixing, and repeated for three times. The drying in vacuum was carried out at 120° C. for 6 hours. Finally, a cerium dioxide-supported low-dose PtCu ultrafine alloy catalyst 2 was obtained, wherein a mass percentage of the PtCu ultrafine alloy was 0.1%.

Embodiment 3

In step S1, 6.8 μmol of chloroplatinic acid, 136 μmol of copper acetate, and 22 mL of oleylamine were put into a round-bottom flask, and 3 mL of ethylene glycol was added dropwise while stirring to obtain a solution A.

In step S2, argon was continuously introduced into the solution A to remove $O_2$ in the solution A, then the round-bottom flask filled with the solution A was sealed, and transferred into a constant-temperature magnetic stirrer to carry out an oil bath reaction, wherein the oil bath reaction was carried out at 300° C. for 1 hour, and then the mixture was cooled to 30° C. to obtain a solution B.

In step S3, the solution B was centrifuged to obtain a solid-phase substance C, wherein the centrifugation was carried out at a revolution of 5,000 rpm for 150 minutes. The solid-phase substance C was washed and purified, wherein a specific process was that: step I, 30 mL of absolute ethyl alcohol was added into the solid-phase substance C, and the mixture was centrifuged after ultrasonic mixing; step II, 20 mL of n-hexane was added, and the mixture was centrifuged after ultrasonic mixing; step III, the step II was repeated once; and step IV, the step I was repeated for three times, and then a solid-phase substance D was obtained.

In step S4, the solid-phase substance D was dissolved in 20 mL of n-butylamine to obtain a solution E, and cerium dioxide powder was modified. A preparation method of the cerium dioxide was that: 1.1 g of cerium oxide powder was transferred into a fixed bed reactor, a humidity in the reactor was controlled by adopting a nitrogen bubbling device, wherein the humidity was 80%, and calcination was carried out at 400° C. for 8 hours in a mixed gas atmosphere of hydrogen and nitrogen, wherein a volume ratio of the hydrogen to the nitrogen in the mixed gas was 1:9. Then, dehumidification was carried out by introducing nitrogen for blowing at 400° C. for 1 hour, and then calcination was carried out at 400° C. for 1 hour in a mixed gas atmosphere of air and nitrogen, wherein a volume ratio of the air to the nitrogen in the mixed gas was 1:0.1. Then, 1 g of modified cerium dioxide powder was immersed in the solution E, magnetically stirred in a dark place, and then centrifuged, washed with alcohol and dried in vacuum in sequence. The centrifugation was carried out at a revolution of 3,000 rpm for 30 minutes. A specific process of the washing with alcohol was that: 15 mL of absolute ethyl alcohol was added, the mixture was centrifuged after ultrasonic mixing, and repeated for three times. The drying in vacuum was carried out at 30° C. for 72 hours. Finally, a cerium dioxide-supported low-dose PtCu ultrafine alloy catalyst 3 was obtained, wherein a mass percentage of the PtCu ultrafine alloy was 1%.

Embodiment 4

In step S1, 9.5 μmol of chloroplatinic acid, 285.5 μmol of copper acetate, and 30 mL of oleylamine were put into a round-bottom flask, and 20 mL of ethylene glycol was added dropwise while stirring to obtain a solution A.

In step S2, argon was continuously introduced into the solution A to remove $O_2$ in the solution A, then the round-bottom flask filled with the solution A was sealed, and transferred into a constant-temperature magnetic stirrer to carry out an oil bath reaction, wherein the oil bath reaction was carried out at 100° C. for 36 hours, and then the mixture was cooled to 30° C. to obtain a solution B.

In step S3, the solution B was centrifuged to obtain a solid-phase substance C, wherein the centrifugation was carried out at a revolution of 5,000 rpm for 360 minutes. The solid-phase substance C was washed and purified, wherein a specific process was that: step I, 30 mL of absolute ethyl alcohol was added into the solid-phase substance C, and the mixture was centrifuged after ultrasonic mixing; step II, 30 mL of n-hexane was added, and the mixture was centrifuged after ultrasonic mixing; step III, the step II was repeated once; and step IV, the step I was repeated for three times, and then a solid-phase substance D was obtained.

In step S4, the solid-phase substance D was dissolved in 25 mL of n-butylamine to obtain a solution E, and cerium dioxide powder was modified. A preparation method of the cerium dioxide was that: 300 mg of cerium oxide powder was transferred into a fixed bed reactor, a humidity in the reactor was controlled by adopting a nitrogen bubbling device, wherein the humidity was 10%, and calcination was carried out at 200° C. for 12 hours in a mixed gas atmosphere of hydrogen and nitrogen, wherein a volume ratio of the hydrogen to the nitrogen in the mixed gas was 1:0.1. Then, dehumidification was carried out by introducing nitrogen for blowing at 200° C. for 1 hour, and then calcination was carried out at 200° C. for 24 hours in a mixed gas atmosphere of air and nitrogen, wherein a volume ratio of the air to the nitrogen in the mixed gas was 1:0.1. Then, 200 mg of modified cerium dioxide powder was immersed in the solution E, magnetically stirred in a dark place, and then centrifuged, washed with alcohol and dried in vacuum in sequence. The centrifugation was carried out at a revolution of 10,000 rpm for 3 minutes. A specific process of the washing with alcohol was that: 10 mL of absolute ethyl alcohol was added, the mixture was centrifuged after ultrasonic mixing, and repeated for three times. The drying in vacuum was carried out at 60° C. for 36 hours. Finally, a cerium dioxide-supported low-dose PtCu ultrafine alloy catalyst 4 was obtained, wherein a mass percentage of the PtCu ultrafine alloy was 10%.

Embodiment 5

In step S1, 0.8 μmol of chloroplatinic acid, 0.8 μmol of copper acetate, and 2 mL of oleylamine were put into a round-bottom flask, and 20 mL of ethylene glycol was added dropwise while stirring to obtain a solution A.

In step S2, argon was continuously introduced into the solution A to remove $O_2$ in the solution A, then the round-bottom flask filled with the solution A was sealed, and transferred into a constant-temperature magnetic stirrer to carry out an oil bath reaction, wherein the oil bath reaction was carried out at 150° C. for 12 hours, and then the mixture was cooled to 30° C. to obtain a solution B.

In step S3, the solution B was centrifuged to obtain a solid-phase substance C, wherein the centrifugation was carried out at a revolution of 10,000 rpm for 30 minutes. The solid-phase substance C was washed and purified, wherein a specific process was that: step I, 20 mL of absolute ethyl alcohol was added into the solid-phase substance C, and the mixture was added after ultrasonic mixing; step II, 20 mL of n-hexane was added, and the mixture was centrifuged after ultrasonic mixing; step III, the step II was repeated once; and step IV, the step I was repeated for three times, and then a solid-phase substance D was obtained.

In step S4, the solid-phase substance D was dissolved in 20 mL of n-butylamine to obtain a solution E, and cerium dioxide powder was modified. A preparation method of the cerium dioxide was that: 2.1 g of cerium oxide powder was transferred into a fixed bed reactor, a humidity in the reactor was controlled by adopting a nitrogen bubbling device, wherein the humidity was 50%, and calcination was carried out at 600° C. for 1 hour in a mixed gas atmosphere of hydrogen and nitrogen, wherein a volume ratio of the hydrogen to the nitrogen in the mixed gas was 1:5. Then, dehumidification was carried out by introducing nitrogen for blowing at 600° C. for 1 hour, and then calcination was carried out at 700° C. for 1 hour in a mixed gas atmosphere of air and nitrogen, wherein a volume ratio of the air to the nitrogen in the mixed gas was 1:9. Then, 2 g of modified cerium dioxide powder was immersed in the solution E, magnetically stirred in a dark place, and then centrifuged, washed with alcohol and dried in vacuum in sequence. The centrifugation was carried out at a revolution of 8,000 rpm for 5 minutes. A specific process of the washing with alcohol was that: 20 mL of absolute ethyl alcohol was added, the mixture was centrifuged after ultrasonic mixing, and repeated for three times. The drying in vacuum was carried out at 80° C. for 12 hours. Finally, a cerium dioxide-supported low-dose PtCu ultrafine alloy catalyst 5 was obtained, wherein a mass percentage of the PtCu ultrafine alloy was 0.01%.

Comparative Example 1

In step S1, 10.3 μmol of chloroplatinic acid and 20 mL of oleylamine were put into a round-bottom flask, and 20 mL of ethylene glycol was added dropwise while stirring to obtain a solution A.

In step S2, argon was continuously introduced into the solution A to remove $O_2$ in the solution A, then the round-bottom flask filled with the solution A was sealed, and transferred into a constant-temperature magnetic stirrer to carry out an oil bath reaction, wherein the oil bath reaction was carried out at 180° C. for 1 hour, and then the mixture was cooled to 30° C. to obtain a solution B.

In step S3, the solution B was centrifuged to obtain a solid-phase substance C, wherein the centrifugation was carried out at a revolution of 10,000 rpm for 20 minutes. The solid-phase substance C was washed and purified, wherein a specific process was that: step I, 30 mL of absolute ethyl alcohol was added into the solid-phase substance C, and the mixture was centrifuged after ultrasonic mixing; step II, 30 mL of n-hexane was added, and the mixture was centrifuged after ultrasonic mixing; step III, the step II was repeated once; and step IV, the step I was repeated for three times, and then a solid-phase substance D was obtained.

In step S4, the solid-phase substance D was dissolved in 15 mL of n-butylamine to obtain a solution E, and cerium dioxide powder was modified. A preparation method of the cerium dioxide was that: 1.1 g of cerium oxide powder was transferred into a fixed bed reactor, and calcined at 400° C. for 2 hours in a mixed gas atmosphere of hydrogen and nitrogen, wherein a volume ratio of the hydrogen to the nitrogen in the mixed gas was 1:1. Then, nitrogen was introduced for blowing at 400° C. for 1 hour, and then calcined at 400° C. for 2 hours in a dry mixed gas atmosphere of air and nitrogen, wherein a volume ratio of the air to the nitrogen in the mixed gas was 1:1. Then, 1 g of modified cerium dioxide powder was immersed in the solution E, magnetically stirred in a dark place, and then centrifuged, washed with alcohol and dried in vacuum in sequence. The centrifugation was carried out at a revolution of 8,000 rpm for 10 minutes. A specific process of the washing with alcohol was that: 20 mL of absolute ethyl alcohol was added, the mixture was centrifuged after ultrasonic mixing, and repeated for three times. The drying in vacuum was carried out at 60° C. for 12 hours. Finally, a cerium dioxide-supported low-dose Pt catalyst 1 was obtained, wherein a mass percentage of the PtCu ultrafine alloy was 0.2%.

Experimental Example 1

A cycling stability test chart of the cerium dioxide-supported low-dose PtCu ultrafine alloy catalyst prepared by the present invention simultaneously degrading cyclohexane and soot under a photothermocatalytic condition was provided.

Experimental method: a photothermocatalytic performance of the catalyst was characterized by a photo-thermal fixed bed reactor (one side of the reactor was provided with a window through which light could irradiate). 100 mg of catalyst prepared by the method in Embodiment 1 (or Comparative Example 1) and 1 mg of soot were evenly ground, and then filled into a quartz reaction tube with an inner diameter of 6 mm, a temperature was controlled by utilizing a thermocouple, and the experiment was carried out at 30° C. to 420° C. Cyclohexane vapor was generated by an $N_2$ bubbling device, diluted to 30 ppm with dry air, and then introduced into the reaction tube. A total gas flow rate was 50 mL·min$^{-1}$, and a space velocity was 30,000 mL·h$^{-1}$·g$^{-1}$. After the catalyst was adsorbed at a room temperature for 24 hours in a dark place to reach an adsorption-desorption balance, a 300 W xenon lamp ($\lambda$=300 nm to 780 nm, light intensity of 200 mw·cm$^{-2}$) was turned on, and heating was carried out for a photothermocatalytic reaction (at a heating rate of 1° C.·min$^{-1}$). Reaction tail gas was introduced into a gas chromatography (GC9800, double FID detector) for on-line analysis of a concentration of the cyclohexane and an output of $CO_2$. Sampling analysis was carried out on the gas chromatography every 10 minutes during the experiment.

Experimental results: FIG. 1 is the cycling stability test chart of the cerium dioxide-supported low-dose PtCu ultrafine alloy catalyst simultaneously degrading cyclohexane and soot under the photothermocatalytic condition. The catalyst is prepared by the method in Embodiment 1, and a catalytic performance thereof is compared with that of the cerium dioxide-supported low-dose Pt catalyst 1 in Comparative Example 1. Mass percentages of Pt in the cerium dioxide-supported low-dose PtCu ultrafine alloy catalyst 1 and Pt in the cerium dioxide-supported low-dose Pt catalyst 1 are both 0.2%, and a little difference in acid amount therebetween is proven by $NH_3$-TPD characterization, but a surface acid strength of the former is decreased. It can be seen from FIG. 1 that compared with the cerium dioxide-supported low-dose Pt catalyst 1, the cerium dioxide-supported low-dose PtCu ultrafine alloy catalyst 1 shows better photothermocatalytic activity and stability. Under illumination conditions ($\lambda$=300 nm to 780 nm, light intensity of 200 mw·cm$^{-2}$) of the newly prepared cerium dioxide-supported low-dose PtCu ultrafine alloy catalyst 1 and cerium dioxide-supported low-dose Pt catalyst 1, temperatures of complete degradation (>99%) of the cyclohexane are 250° C. and 350° C. respectively, and temperatures of maximum contents of the $CO_2$ are 320° C. and 360° C. respectively. After two cycling stability tests, the temperature required for complete degradation of cyclohexane and soot by the cerium dioxide-supported low-dose Pt catalyst 1 is increased obviously. However, after three cycling stability tests, the catalytic performance of the cerium dioxide-supported low-dose PtCu ultrafine alloy catalyst 1 is not decreased obviously, which indicates that the photothermocatalytic stability thereof is improved under a synergistic action of PtCu ultrafine alloy and a weak-acidic cerium dioxide support.

The above embodiments are the preferred embodiments of the present invention, but the embodiments of the present invention are not limited by the above embodiments. Any other changes, modifications, substitutions, combinations, and simplifications made without departing from the spirit and principle of the present invention should be equivalent substitute modes, and should be included in the scope of protection of the present invention.

What is claimed is:

1. A preparation method of a cerium dioxide-supported low-dose PtCu ultrafine alloy catalyst, comprising the following steps:
    step S1, mixing chloroplatinic acid, copper acetate, and oleylamine, and dripping ethylene glycol while stirring to obtain a solution A;
    step S2, heating the solution A in an oil bath under protection of argon, and cooling to 30° C. to obtain a solution B;
    step S3, centrifuging the solution B to obtain a solid-phase substance C; and washing and purifying the solid-phase substance C to obtain a solid-phase substance D; and
    step S4, dissolving the solid-phase substance D in n-butylamine to obtain a solution E; immersing cerium dioxide powder in the solution E, magnetically stirring in a dark place, centrifuging to obtain a solid-phase substance F, and washing with alcohol and drying in vacuum to obtain the cerium dioxide-supported low-dose PtCu ultrafine alloy catalyst.

2. The preparation method according to claim 1, wherein a molar ratio of the chloroplatinic acid to the copper acetate in the step S1 is 1:1 to 1:30; a volume ratio of the oleylamine to the ethylene glycol is 1:0.1 to 1:10; and a ratio of the chloroplatinic acid to the oleylamine is 0.3 μmol·mL$^{-1}$ to 0.6 μmol·mL$^{-1}$.

3. The preparation method according to claim 1, wherein a specific process of heating the solution A in the oil bath under the protection of the argon in the step S2 is: continuously introducing the argon into the solution A to remove $O_2$ in the solution A, then sealing a round-bottom flask filled with the solution A, and transferring the round-bottom flask filled with the solution A into a constant-temperature magnetic stirrer to heat the solution A in the oil bath, wherein heating the solution A in the oil bath at 80° C. to 320° C. for 1 hour to 36 hours.

4. The preparation method according to claim 1, wherein the centrifuging in the step S3 is carried out at a revolution of 5,000 rpm to 10,000 rpm for 10 minutes to 360 minutes.

5. The preparation method according to claim 1, wherein a specific process of the washing and the purifying in the step S3 is:
   step I, adding absolute ethyl alcohol into the solid-phase substance C to obtain a first mixture, wherein a volume ratio of the solid-phase substance C to the absolute ethyl alcohol is 1:5 to 1:50, and centrifuging the first mixture after ultrasonic mixing and removing the absolute ethyl alcohol to obtain a washed solid-phase substance C;
   step II, adding n-hexane into the washed solid-phase substance C to obtain a second mixture, wherein a volume ratio of the washed solid-phase substance C to the n-hexane is 1:5 to 1:50, and centrifuging the second mixture after ultrasonic mixing and removing the n-hexane;
   step III, repeating the step II once; and
   step IV, repeating the step I for three times, and then obtaining the solid-phase substance D.

6. The preparation method according to claim 1, wherein a volume ratio of the solid-phase substance D to the n-butylamine in the step S4 is 1:10 to 1:50; and the centrifuging is carried out at a revolution of 3,000 rpm to 10,000 rpm for 3 minutes to 30 minutes.

7. The preparation method according to claim 1, wherein the cerium dioxide powder in the step S4 is obtained through modification treatment, wherein a specific modification method comprises: placing the cerium oxide powder in a fixed bed reactor, controlling a humidity in the reactor by adopting a nitrogen bubbling device, the humidity being 10% to 90%, and calcining at 200° C. to 600° C. for 1 hour to 12 hours in a mixed gas atmosphere of hydrogen and nitrogen, a volume ratio of the hydrogen to the nitrogen in the mixed gas being 1:0.1 to 1:10; and then carrying out dehumidification, which introduces nitrogen for blowing for 1 hour at a calcination temperature in a previous stage, and finally calcining at 200° C. to 800° C. for 1 hour to 24 hours in a mixed gas atmosphere of air and nitrogen, a volume ratio of the air to the nitrogen in the mixed gas being 1:0.1 to 1:10.

8. The preparation method according to claim 1, wherein in the step S4, a specific process of the washing with alcohol is: adding absolute ethyl alcohol into the solid-phase substance F to obtain a third mixture, a volume ratio of the solid-phase substance F to the absolute ethyl alcohol being 1:5 to 1:30, and centrifuging the third mixture after ultrasonic mixing; and the drying in vacuum is specifically carried out at 30° C. to 120° C. for 6 hours to 72 hours.

* * * * *